United States Patent Office 2,747,100
Patented May 22, 1956

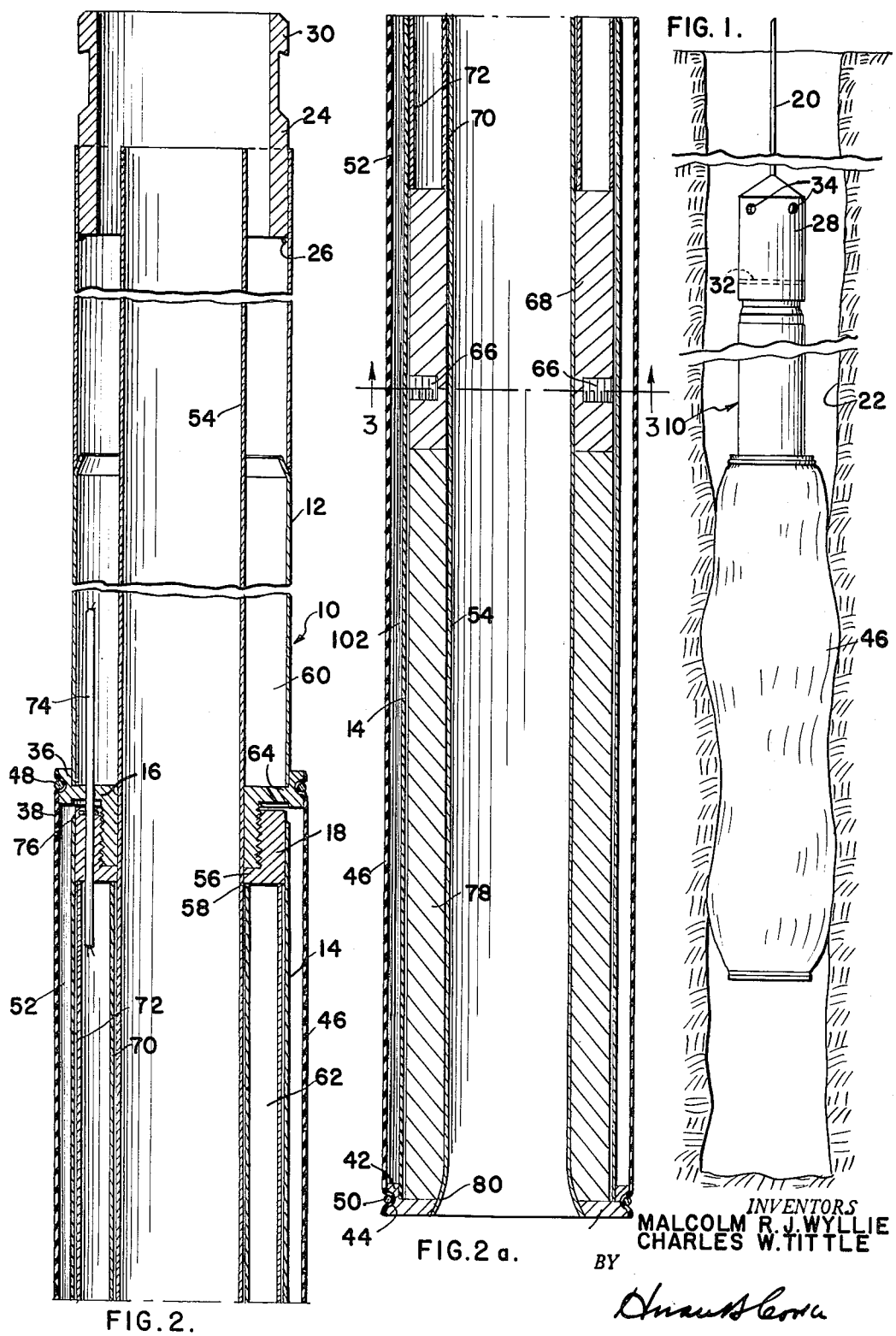

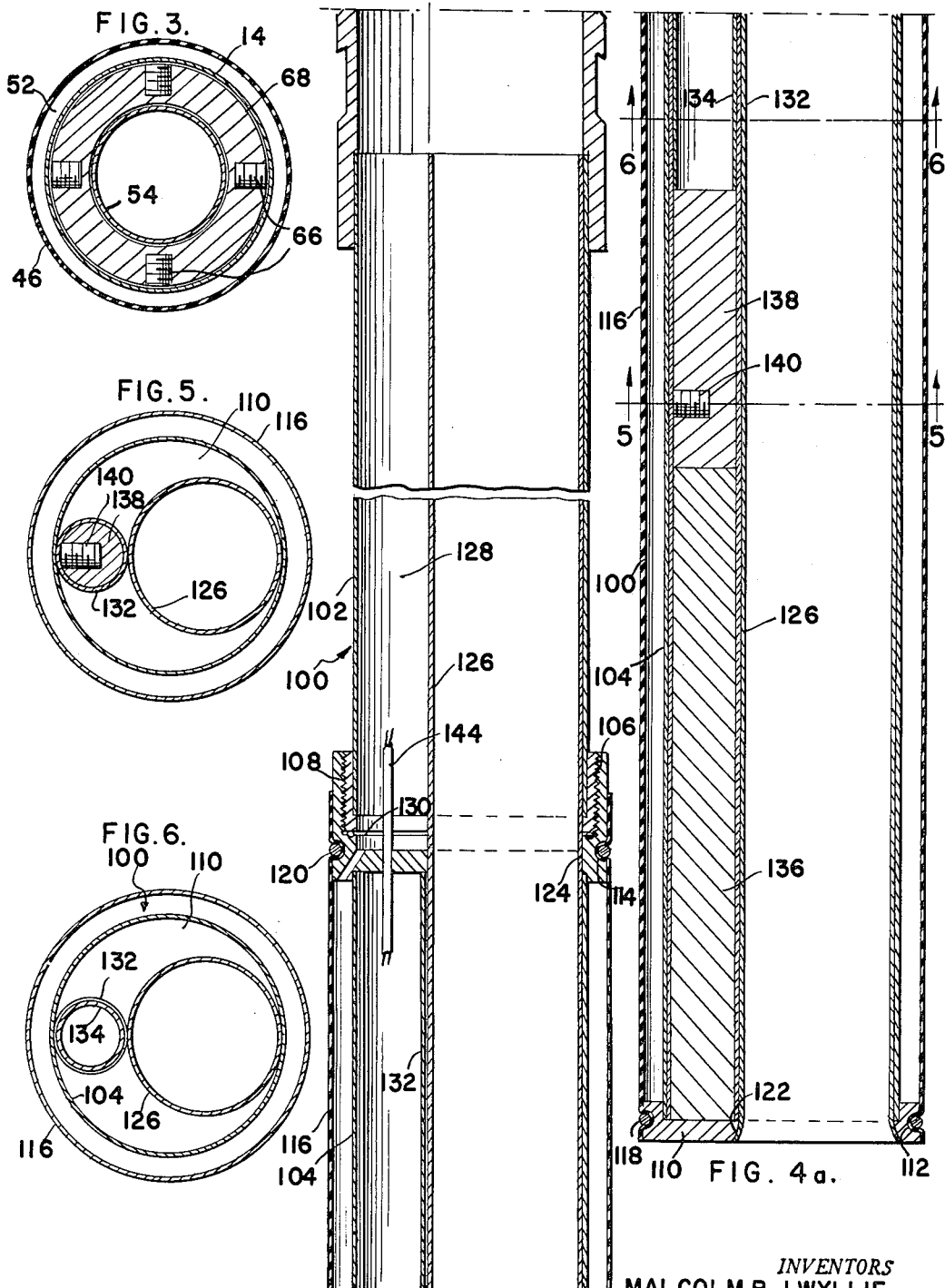

2,747,100

METHOD AND APPARATUS FOR DISPLACING WELL FLUID WITH A FLUID HAVING SMALLER NEUTRON ATTENUATION CHARACTERISTICS

Malcolm R. J. Wyllie, Indiana Township, Allegheny County, and Charles W. Tittle, Oakmont, Pa., assignors to Gulf Research & Development Company, Pittsburgh, Pa., a corporation of Delaware Application September 19, 1952, Serial No. 310,382

10 Claims. (Cl. 250—43.5)

The present invention relates to new and useful improvements in methods and apparatus employed in borehole logging, and more particularly pertains to a method and apparatus for mitigating or eliminating entirely the neutron attenuating effects of borehole fluid normally intervening between the source of neutrons and the formations being surveyed and also between such formations and the neutron detector.

The presence of borehole fluid in the vicinity of and especially when surrounding a neutron detector imposes serious limitations on the sensitivity and accuracy of the results obtained. A detailed exposition on the militating effects of borehole fluid on neutron logging is to be found in Geophysics, volume 16, pages 626–658.

The detrimental effects of borehole fluid on neutron logs are primarily due to the hydrogenous character of such fluids, it being well known that hydrogen is an excellent neutron moderator as there is an almost equal distribution of kinetic energy between a hydrogen nucleus and a neutron after they have collided. This means that a collision between a high energy neutron and a hydrogen nucleus results in approximately reducing the kinetic energy of the neutron by one-half. Inasmuch as borehole fluid ordinarily contains either water or hydrocarbons, whether the same is introduced to the borehole from the surface or flows into the borehole from the strata penetrated thereby, it is evident that the same will include a substantial amount of combined hydrogen, and thereby have a marked influence on neutrons passing therethrough.

Workers in this field have recognized the problem presented by borehole fluid, and have attempted to minimize the neutron-attenuating effects of borehole fluid by providing as large a housing for the neutron-detecting device as the minimum diameter of the borehole will permit so that the housing will displace as much borehole fluid as possible from about the neutron-detecting device, with such housing being formed of a material having relatively lower neutron attenuating characteristics, such as aluminum. In order to permit as close tolerance as possible between housing and the borehole and in order to facilitate vertical movement of the apparatus through borehole fluid, at least one prior art construction provides a control opening through the housing for the passage of borehole fluid.

In so far as is known, no solution has heretofore been suggested for overcoming the peculiar problems presented where the borehole is irregular in its transverse dimensions. As is known, boreholes commonly are not circular cylinders in shape due to variations in physical properties of the strata through which they pass, the percolation of subterranean fluids, manner of drilling, etc. Consequently, the use of rigid cylindrical housings, such as known to the art, is particularly inefficient in displacing borehole fluid where the area in transverse section of the borehole exceeds that of the housing, it being noted that the maximum transverse dimensions of the rigid housings are limited by the minimum transverse dimensions of the bore.

It is therefore the fundamental aim of the instant invention to provide a method and apparatus to displace borehole fluid from about neutron-logging apparatus in substantially its entirety irrespective of considerable variations of the borehole as to its transverse configuration and area.

In accordance with the fundamental aim of this invention, another desideratum of this invention is to displace borehole fluid with a fluid material having relatively lower neutron attenuating characteristics than the borehole fluid.

Another purpose of this invention is to provide neutron-logging apparatus, which for a particular set of dimensions thereof may be used efficiently in a plurality of boreholes of a wide range of minimum dimensions.

In the drawings:

Figure 1 is a broken side elevational view of the invention, showing the same in operative position within a well bore;

Figures 2 and 2a are enlarged central vertical sectional views of upper and lower portions of the invention, respectively, the neutron detector being removed and a portion only of the electrical conduit for such detector being illustrated;

Figure 3 is a horizontal sectional view taken upon the plane of the section line 3—3 in Figure 2a;

Figures 4 and 4a are enlarged central vertical sectional views of upper and lower portions of another embodiment of the invention, respectively, the neutron detector being removed and a portion only of the electrical conduit for such detector being shown; and, Figures 5 and 6 are each horizontal sectional views taken upon the planes of the section lines 5—5 and 6—6 of Figure 4a, respectively.

Attention is first directed to the form of the invention illustrated in Figures 1 through 3, wherein the numeral 10 designates generally a sectional housing or body formed of upper and lower sections 12 and 14, respectively, which are detachably coupled by threaded male and female coupling members 16 and 18, respectively.

Means is provided at the upper end of the housing 10 to permit suspension thereof on a cable 20 by which the housing 10 is raised and lowered within a well bore 22. Such means may conveniently take the form of a collar 24 partially received within and suitably secured to the upper end of the housing section 12 by welding or the like 26. The collar 24 is removably received within a hollow cap structure 28 and releasably locked thereto by any conventional arrangement such as the provision of locking lugs 30 on the collar 24 adapted to cooperate with bayonet-type slots, not shown, in the cap structure 28. In addition, a nutted securing pin 32 may be passed through both the collar 24 and the cap structure 28 to prevent inadvertent disengagement of these parts.

The cap structure 28 is secured by conventional means, not shown, to the cable, and for a purpose subsequently to become apparent is provided with a plurality of openings 34 that afford communication between the interior of the collar 24 and the exterior of the cap structure 28.

The coupling member 16 is secured to housing section 12 and includes a portion 36 that embraces the lower end of the housing section 12 and which is provided with an annular groove 38 in its outer periphery. An annular member 40 is secured to the housing section 14 and like the coupling member 16 it also includes a portion 42 embracing the lower end of the housing section 14 that is provided with an annular groove 44 in its outer periphery.

A radially expansible sleeve 46 embraces the housing 10 and has its opposite end portions seated in and retained in the grooves 38 and 44 by means of securing rings 48 and 50, respectively, so that the sleeve 46 is in fluid tight engagement with the portions 36 and 42.

By stating that the sleeve 46 is radially expansible is meant that the sleeve is fabricated in such form and of such a material as to be deformable by internal pressure to expand radially in all directions, and preferably of such a material that is elastic or resilient so that a lowering of internal pressure relative to external pressure will be accompanied by a reduction in the radial extent of the sleeve and upon return to initial pressure differential conditions will assume its initial shape. The sleeve should also be sufficiently flexible and deformable that it will be capable of expanding to different extents along its length and also in the same transverse plane.

A variety of materials possess the physical properties desired in the sleeve 46. Obviously natural rubber is suitable; however, the susceptibility of natural rubber to attack by hydrocarbons tends to limit its use to environments free of petroleum, etc. Synthetic rubber-like materials or plastic elastomers, such as neoprene are preferred materials of construction. The sleeve 46 may, if desired, be reinforced by embedding a fabric cut on the bias in the material forming the sleeve 46 to permit radial expansion of the sleeve 46. A desideratum in selecting a material for the construction is that such material contain a minimum of elements that markedly attenuate neutrons. It is, of course, not essential that the sleeve be entirely or even substantially free of such elements in view of the fact that the sleeve 46 will have as thin walls as possible commensurate with the strength required of the same in use.

A similar desideratum obtains in the choice of material used in the fabrication of the housing section 14, and aluminum and steel may be listed as being sufficiently transparent to neutrons for the purpose of this invention, although many other materials may obviously be used.

In view of the character of the sleeve 46 and its manner of attachment to the housing 10, it will be appreciated that the sleeve 46 and the housing 10 jointly define a radially expansible annular container such that the space 52 enclosed therein surrounds the housing 10.

A conduit 54 substantially smaller in transverse dimensions than the housing 10 is disposed within and is concentric with the housing 10, such conduit being secured to an inwardly extending flange 56 on the coupling member 18 as by welding 58. Inasmuch as the connections between conduit 56 and the coupling 18, between the coupling members 16 and 18, and between the housing 10 and the coupling member 16 are all fluid tight, it will be observed that the coupling members 16 and 18 constitute a sealing means between the housing 10 and the conduit 54 that divides the annular space 60 within the housing 10 above such members 16 and 18 and exterior to the conduit 54 from the corresponding space 62 below the members 16 and 18.

The space 60 serves as a fluid reservoir, and such space 60 is in communication with space 52 within the sleeve 46 through an opening 64 provided in the coupling member 16 and between the spaced adjacent ends of the housing sections 12 and 14. As will be evident, a fluid will be free to pass from either of the spaces 60 and 62 to the other, and that portion of the fluid within the space 52 will be subjected to a pressure corresponding to the head of such fluid within the reservoir space 60. Furthermore, it will be clear that a fluid within the space 60 will be subjected to a surface pressure corresponding to the pressure within the conduit 54 since the space 60 is in free communication with the interior of the conduit 54 over the top of the latter. The importance of such consideration will appear presently.

The space 62 serves to receive a neutron source, which in this form of the invention preferably comprises a plurality of slugs 66 threaded into circumferentially spaced complementary sockets in an annular gamma radiation shield 68. The slugs 66 may be composed of any combination of substances productive of neutrons, such as radium-beryllium, polonium-beryllium, or radium D-beryllium. The shield 68 constitutes a holder for the slugs 66 and may be composed of tungsten, high-tungsten alloy, lead, bismuth or other suitable gamma-ray shielding material.

As will be noted upon inspection of Figures 2 and 2a, the gamma shield 68 is spaced a substantial interval below the coupling member 18, a pair of steel or aluminum tubes 70 and 72 serving to maintain the spacing, and although not illustrated, it will be understood that it is into such portion of the space 62 that a neutron detector or sensing device is to be received, and that the shield 68 proscribes any substantial amount of direct gamma radiation passing from the slugs 66 to such space.

A variety of neutron detectors have been devised, and since the same does not in itself constitute the subject matter of the instant invention, it has not been deemed necessary to illustrate the same. Suffice it to say that a proportional or G. M. counter incorporating a neutron reactive substance such as $5B^{10}$, or a combination of neutron reactive material, phosphor and photomultiplier will serve the purpose of the invention, although the use of the latter combination is thought to be preferable. Obviously, the particular information sought about the neutron flux, such as the energy spectrum thereof, total flux, flux within particular energy ranges (thermal or epithermal for example), etc. will be largely determinative of the type of neutron detector most suitable for the purpose, and it is deemed within the scope of those skilled in the art to make an appropriate selection from the variety of detectors available.

Irrespective of the type of neutron detector or sensing device used, the electrical energy pulses produced thereby are communicated to the earth's surface for recordation by a conductor cable, a portion only of which is indicated at 74. The cable 74 extends through aligned openings in the coupling members 16 and 18, a fluid tight seal 76 being provided in the coupling member 18, and such cable 74 extends upwardly through the housing 10 and is incorporated into the single cable 20.

The portion of the space 62 below the shield is filled with ballast 78, which may be steel, and which serves to strengthen and maintain the housing 10 in a vertical position. As will be noted, the lower end of the conduit 54 is flared, as at 80, and is suitably secured to the annular member 40.

In operation, mercury or an alloy of metals having a fusion point below temperatures prevailing in the borehole to be logged is placed in the space 52 within the sleeve 46 and in the reservoir space 60. Exemplary of alloys that may be suitable for use depending on borehole temperatures are the eutectic compositions of bismuth-lead-tin-cadmium (Wood's metal) having a melting point of 158° F., bismuth-lead-cadmium having a melting point of 197° F., bismuth-lead-tin having a melting point of 203° F., and bismuth-lead having a melting point of 256° F. It will be manifest that external heating means may be employed, where necessary, to insure fluidity of the alloy prior to introducing the apparatus into the well bore, and if deemed expedient, electric heating coils may be permanently incorporated with the apparatus to maintain the alloy at a temperature above its melting point.

The paramount factors to be considered in selecting a fluid, aside from its melting point, are that the fluid must have a density exceeding that of the borehole fluid, and must lower neutron-attenuating characteristics with respect to the neutron energies to be measured than the borehole fluid. Since naturally occurring mercury has a fairly low cross section for epithermal and higher energy neutrons and moderates neutron energies to a very slight extent, this metal is preferred, except when thermal neutrons are to be detected, in which case the bismuth-lead-tin or bismuth-lead alloy, previously mentioned, would be suitable. It will be observed that although some of the alloys mentioned above contain cadmium, the use of such alloys is satisfactory in the logging of neutrons of energies exceeding the cadmium resonance peak.

The fluid in the reservoir space 60, as mentioned previously, will exert a hydrostatic pressure upon the portion of such fluid in the space 52. Inasmuch as the space 60 communicates through the conduit 54 and the openings 34 with the borehole fluid ambient to the sleeve 46, a pressure differential will exist in favor of the fluid within the sleeve 46 over the borehole fluid ambient the sleeve 46 of an amount determined by how much the density of the displacement fluid, which we will assume for purposes of explanation is mercury, exceeds the density of the borehole fluid and the height to which the mercury extends within the reservoir space 60. Thus, irrespective of the borehole fluid pressure acting on the sleeve 46, which would of course vary during vertical travel of the apparatus, the fluid pressure within the sleeve 46 will always exceed the same by a substantially fixed amount making proper allowance for variations in fluid level within the reservoir space 60 during expansions and contractions of the sleeve 46.

In view of the foregoing, the vertical extent of the housing 10 and the conduit 54 above the coupling member 16 is made great enough to permit an amount of mercury to be placed within the reservoir space 60 that will at all times exert sufficient pressure upon the interior of the sleeve 46 so as to cause the latter to be expanded into contact with the walls of the borehole 22.

Thus, as the apparatus is moved through the borehole 22 into an enlarged portion thereof, the sleeve 46 will expand with a portion of the fluid in the reservoir space 60 flowing into the sleeve 46, and when the apparatus moves into a more constricted portion of the borehole 22, the sleeve 46 will be forced to contract by the earth formations and cause a portion of the fluid within the sleeve to return to the reservoir space 60. In this manner, by the expansions and contractions of the sleeve in conformity with variations in borehole dimensions as the apparatus is moved vertically, the displacing fluid of relatively lower neutron attenuating characteristics than the borehole fluid continuously displaces substantially all of the borehole fluid surrounding the neutron source and the neutron detector.

The conduit 54 permits free movement of the apparatus through borehole fluid. It is to be particularly noted that conduit 54 directs the flow of such borehole fluid through the apparatus in such a fashion as not to interpose the same between the formation and either the neutron source or the neutron detector.

It will be evident that the described method of displacing borehole fluid is of value either when utilizing a neutron source or when the neutron source is dispensed with, as in the logging of neutrons naturally occurring in the earth formations.

Attention is now invited to the form of the invention illustrated in Figures 4 through 6, which differs from the previously-described embodiment primarily in the fact that the neutron source and the neutron detector are disposed at one side of the apparatus and the borehole fluid conduit at the other side.

This form of the invention comprises a sectional housing 100 formed of upper and lower sections 102 and 104, respectively. The lower end of the section 102 is provided with a threaded collar 106, and the upper end of the section 104 is secured to an internally threaded cap 108 that in turn threadingly receives the collar 106 so as to detachably secure the sections 102 and 104.

An end plate 110 is secured to the lower end of the section 104, and plate 110 and cap 108 are provided with annular grooves 112 and 114, respectively, in which grooves are seated the opposite end portions of a radially expansible sleeve 116 that embraces the housing 100.

The sleeve 116 is of the same character as previously-described sleeve 46, and is retained in the grooves 112 and 114 by securing rings 118 and 120 respectively.

The end plate 110 and the cap 109 are provided with aligned openings 122 and 124, respectively, which are eccentrically disposed with respect to the housing 100. A conduit 126 is disposed in the housing 100, having its lower end positioned in the opening 122 and secured to the plate 110, and intermediate its ends, extending through the opening 124 and secured to the cap 108.

It will thus be seen that the cap 108 divides the space within the housing 100 external to the conduit into an upper fluid reservoir space 128 and a space therebelow for the reception of neutron source and detecting equipment.

As in the previous embodiment and for a similar purpose communication is afforded between the interior of the reservoir space 128 and the interior of the sleeve 116, such communication in this instance taking the form of an opening 130 through the cap 108.

A tube 132, which like housing section 104 is formed of some fairly neutron-transparent material such as aluminum or steel, is seated between the end plate 110 and the cap 108. A smaller tube 134 of similar material is disposed within the upper portion of tube 132 and a suitable neutron detector, not shown, is positioned within tube 134.

A cylindrical steel ballast 136 is disposed in the lower portion of the tube 132, and intermediate the ballast 136 and the tube 134 is seated a cylindrical gamma shield 138 of such material described as suitable for shield 68. Threaded into a socket in the shield 138 on the side thereof opposite conduit 126 and immediately adjacent the section 104 is a neutron source 140 similar to the neutron source 66 previously described.

The upper end of the housing 100 is provided with a suitable coupling element 142 which is adapted to cooperate for the same purposes with structure not illustrated in connection with this particular embodiment of the invention, but which is similar to the elements 20, 28 and 32 illustrated and described in connection with the form of the invention shown in Figures 1 through 3

An electrical conduit cable 144, shown only in part, corresponds in purpose and function to previously-described cable 74, and extends from the neutron detector receiving tube 134 through the cap 108.

The operation of this form of the invention is identical to the described operation of the other form of the invention in so far as the fluid actuation of the sleeve 116 to displace borehole fluid is concerned.

The principal distinctions between the first and the latter-described forms of the invention reside in the fact that with the latter-described form of the invention, the source of neutrons concentrates the flux produced thereby on one side of the borehole, and also concentrates the neutron sensitivity upon the same side of the formation, thereby further reducing the relative importance of the masking effect of borehole fluid. In addition, for a given size housing and borehole fluid conduit, the latter-described embodiment of the invention will permit the use of a neutron detector of larger diameter. This latter consideration is of particular importance when it is desired to secure the advantages of using photomultiplier equipment.

Numerous modifications of the invention will come to mind in the light of the preceding description, which has been given in elaborate detail in the interest of conveying complete understanding rather than imposing limitations thereon and, accordingly, reference should be made to the appended claims for the actual scope of the invention.

What we claim is:

1. In the method of borehole logging wherein a probe including a neutron detector is moved through a borehole, an improvement for reducing undesired neutron attenuation by borehole fluid; said improvement comprising displacing a substantial portion of borehole fluid surrounding the probe by a fluid of low neutron-attenuation characteristics, constraining the last-mentioned fluid to move with the probe, expanding and contracting the horizontal extent of the last-mentioned fluid during movement of the probe to correspond to irregularities in borehole dimensions, and substantially preventing the movement of borehole fluid between the wall of the borehole and the fluid of low neutron attenuation characteristics by by-passing borehole fluid through the probe.

2. In the neutron logging of boreholes containing borehole fluid wherein a neutron sensing device is moved vertically through the borehole, an improvement comprising the steps of surrounding the neutron- sensing device with a liquid of low neutron attenuation characteristics selected from the group consisting of mercury and low fusion-point metallic alloys, constraining the liquid to travel vertically with the neutron-sensing device while limiting lateral movement of the liquid to the horizontal extent of the borehole, and mainaining the liquid under a pressure exceeding that of the borehole fluid adjacent thereto while by-passing borehole fluid in a stream of predetermined cross-section.

3. In combination with neutron-logging apparatus of the type including a neutron-sensing device adapted to be moved vertically in a borehole containing borehole fluid, the improvement comprising means for constraining a displacement fluid surrounding the neutron sensing device to travel vertically with such device and also for limiting lateral movement of the displacement fluid to the horizontal extent of the borehole, means for maintaining the displacement fluid at a pressure exceeding that of the borehole fluid adjacent thereto, and passageway means for by-passing borehole fluid.

4. In neutron-borehole-logging apparatus, a neutron-detector housing adapted to be moved along a borehole, a horizontally expansible fluid container surrounding said housing a fluid reservoir extending above said container and having free communication therewith, and mercury in said container and said reservoir.

5. In neutron-borehole-logging apparatus, a neutron-detector housing adapted to be moved vertically in a well bore and having a borehole fluid passageway extending vertically therethrough, a horizontally expansible fluid container surrounding the housing, and a fluid reservoir extending above said container and having communication therewith, mercury in said container and said reservoir, said passageway having communication with the top of the reservoir.

6. In neutron-logging apparatus, an elongated vertically disposed, hollow body, a vertically extending conduit within the body, said conduit having lesser external transverse dimensions than the corresponding internal dimensions of the hollow body so as to afford a space within the hollow body external to the conduit, means intermediate the ends of the body and below the upper end of the conduit effecting a fluid tight seal between the body and the conduit, a radially expansible sleeve embracing the body and having its upper and lower ends sealed respectively above and below said means to the body, and means affording communication between the interior of the sleeve and that portion of the interior of the body above the first-mentioned means and also below the top of the conduit.

7. The combination of claim 6, wherein said body and said conduit are substantially cylindrically shaped and are eccentrically arranged.

8. In neutron-logging apparatus, an upright hollow cylindrical body and a substantially smaller vertical conduit therein affording a space within the body that is external to the conduit, fluid tight sealing means disposed in said space and dividing the same horizontally into an upper fluid reservoir space and a lower space, a neutron source and a neutron detector in said lower space, a radially expansible sleeve embracing the body and sealed to the body at spaced positions to define therewith a variable volume annular container surrounding the lower space, and means affording fluid communication between said reservoir space and the interior of said container.

9. The combination of claim 8, wherein said conduit is cylindrical and concentric with the body, said neutron source embracing the conduit.

10. The combination of claim 8, wherein the conduit is eccentrically disposed with respect to the body, the source and the detector on one hand and the conduit on the other hand being disposed adjacent diametrically opposed portions of the body.

References Cited in the file of this patent
UNITED STATES PATENTS

| 2,207,001 | Dillon | July 9, 1940 |
| 2,342,884 | Moore | Feb. 29, 1944 |
| 2,509,908 | Crumrine | May 30, 1950 |
| 2,515,534 | Thayer et al. | July 18, 1950 |
| 2,652,496 | Herzog et al. | Sept. 15, 1953 |